(12) United States Patent
Britz

(10) Patent No.: US 7,354,226 B2
(45) Date of Patent: Apr. 8, 2008

(54) HAND-HELD POWER TOOL WITH A DUST SUCTION MODULE

(75) Inventor: Rory Britz, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 457 days.

(21) Appl. No.: 11/153,841

(22) Filed: Jun. 15, 2005

(65) Prior Publication Data
US 2005/0281627 A1   Dec. 22, 2005

(30) Foreign Application Priority Data
Jun. 16, 2004   (DE) .................... 10 2004 029 220

(51) Int. Cl.
*B23B 47/34*   (2006.01)
(52) U.S. Cl. .................... 408/67; 175/209; 173/75; 173/198; 144/252.1
(58) Field of Classification Search ............ 173/75, 173/198, 217; 144/252.1; 175/209; 408/67, 408/58; 409/137, 182; 451/456; *B23B 47/34*
See application file for complete search history.

(56) References Cited

U.S. PATENT DOCUMENTS

| 1,990,991 | A | * | 2/1935 | Heubach ...................... 409/137 |
| 2,517,882 | A | * | 8/1950 | Johnson ........................ 173/46 |
| 3,850,254 | A | * | 11/1974 | Hirdes .......................... 173/75 |
| 5,113,951 | A | * | 5/1992 | Houben et al. ................. 173/75 |
| 5,129,467 | A | * | 7/1992 | Watanabe et al. .............. 173/75 |
| 5,199,501 | A | * | 4/1993 | Kluber et al. .................. 173/75 |
| 6,543,549 | B1 | * | 4/2003 | Riedl et al. ................... 173/216 |
| 6,615,930 | B2 | * | 9/2003 | Bongers-Ambrosius et al. ........................... 173/198 |
| 6,776,245 | B2 | * | 8/2004 | Kristen et al. ............... 173/217 |
| 6,848,985 | B2 | * | 2/2005 | Lamprecht et al. ......... 451/453 |
| 6,851,898 | B2 | * | 2/2005 | Ege et al. ...................... 408/67 |
| 6,951,439 | B2 | * | 10/2005 | Arich ........................... 408/67 |
| 7,182,150 | B2 | * | 2/2007 | Grossman ................... 173/198 |

FOREIGN PATENT DOCUMENTS

| CH | 627098 A5 | * | 12/1981 |
| GB | 2247852 A | * | 3/1992 |
| WO | WO 2005025792 A1 | * | 3/2005 |

* cited by examiner

*Primary Examiner*—Daniel W. Howell
(74) *Attorney, Agent, or Firm*—Abelman, Frayne & Schwab

(57) ABSTRACT

A hand-held power tool (2) connectable with a dust suction module (32) includes a motor (64) and an air flow generator (66) which for cooling the motor (64) is located, together with the motor (64), in air flow path (62) between an air inlet and an air outlet (16) both formed in the tool housing, (4, 6), with an air inlet having a side opening (18) and a connection opening (20) connectable with the suction path (60) of the dust suction module (32) and the dust suction module (32) having a suction conduit (58) for connecting the suction path (60) with the air flow path (62) and adjoining the connection opening (20) in a connected condition of the dust suction module (32) with the power tool, and with the power tool (2) further having a closing member provided on the connection opening (20), operable by the dust suction module (32), and having, in an attached position of the dust section module (32), an open position, and having a closed position in the detached condition of the dust suction module (32).

7 Claims, 2 Drawing Sheets

HAND-HELD POWER TOOL WITH A DUST SUCTION MODULE

BACKGROUND OF THE INVENTION

1. Field of the Invention

The present invention relates to a hand-held power tool connectable, if necessary, with a dust suction module for aspirating the to-be-removed material produced during the operation of the power tool.

2. Description of the Prior Art

The hand-held power tool, which is connectable with the dust suction module, includes a motor and an air flow generator that for cooling the motor is located, together with the motor, in a cooling flow path between an air inlet and an air outlet which are formed in the tool housing. The dust suction module is provided with a suction conduit that adjoins the inlet so that a connection between the suction path of the dust suction module and the cooling flow path can be established.

Hand-held power tools of the type discussed above can be rapidly and simply equipped with a dust suction module, when needed, in order to remove material which is produced during operation of the tool, such as drillings, dust, or saw chips. The dust suction module can be made particularly light and compact as it does not require an air flow generator. Rather, the air flow generator produces both air flow which is required for cooling the motor, and air flow which is required in the suction path and with which the removable material is aspirated.

U.S. Pat. No. 5,113,951 discloses a drilling tool the drive gear housing of which has an air inlet. With a ventilator mounted on the motor shaft, air is aspirated through the air inlet and is circulated along a cooling flow path in the interior of the tool housing past the motor for cooling the same. Finally, a heated air, which is produced as a result of cooling the motor, exits through an air outlet which is formed, with respect to the operational direction of the drilling tool, behind the inlet. The air inlet is so formed that a free end of the suction conduit of the dust suction module can be inserted thereinto. In this way, the air necessary for cooling the motor is aspirated through the dust suction module that also serves for aspiration of drillings. The air is used for cooling the motor after it passes a filter.

The drawback of the drilling tool which is disclosed in U.S. Pat. No. 5,113,951, consists in that with the dust suction module having been removed, there exists a danger that a non-purified air would be aspirated for cooling the motor. This can lead to damage of both the motor and the drive gear. This danger is enhanced by the position of the air inlet in the housing close to the working tool, so that dirt can enter into the cooling air path with a particular ease. The position of the air inlet in the vicinity of the working tool is, however, necessary in order to be able to achieve a high suction capacity. Further, there exists a danger that during the operation with the dust suction module, its filter will be so clogged that a sufficiently high air flow for cooling the motor would not be available. This can result in damage of the motor and in reduction of the service life of the motor and the power tool.

Accordingly, an object of the present invention is to provide a hand-held power tool in which the drawbacks of a prior art power tool are eliminated.

Another object of the present invention is to provide a hand-held power tool in which a reliable cooling of the motor is insured.

A further object of the present invention is to provide a hand-held power tool in which a high suction capacity is insured even when a dust suction module is used.

SUMMARY OF THE INVENTION

These and other objects of the present invention, which will become apparent hereinafter, are achieved by providing a hand-held power tool of the type described above and in which the air inlet has a side opening and a connection opening connectable with the suction path of the dust suction module, and a closing member is provided on the connection opening, operable by the dust suction module, and having, in a connected condition of the dust suction module with the power tool, an open position and having a closed position in a disconnected condition of the dust suction module from the power tool and in which the closing member closes the connection opening to a most possible extent. In this way, there is provided, for suction of the cooling air, a separable side opening in the housing. The side opening can be positioned in the housing and oriented there independently of the connection opening.

The provision of a closing member permits to arbitrary arrange the connection opening in the housing, without penetration of dirt through the connection opening into the cooling flow path when the power tool operates without the dust suction module. Therefore, the position of the connection opening can be determined, e.g., based only on fluidic considerations in order to obtain as high a suction capacity as possible. At the same time, the side opening can be so arranged in the housing that no removable material is aspirated thereto.

Advantageously, the closing member is formed as a cover displaceably arranged on the housing, which provides for cost-effective means for closing the connection opening.

Preferably, the cover is supported for a linear displacement between its closed and open positions. This insures a precise guidance of the cover that provides for a sealed closing of the connection opening.

Advantageously, the cover has a stop surface extending transverse to a displacement direction of the dust suction module along which the dust suction module is displaced for connection with the power tool. The dust suction module has an entraining member engageable with the stop surface of the cover for displacing the cover from its closed position to its open position upon connection of the dust suction module with the power tool. Thereby, in a simple manner, the cover can be automatically brought into its open position.

Preferably, the cover is preloaded in its closed position. This insures that the connection opening is automatically closed when the dust suction module is disconnected from the power tool.

Preferably, the connection opening is so formed that it faces in a direction toward the working tool-side of the power tool. Thereby, a shorter suction path, with minimal flow losses between the working tool and the connection opening, is achieved.

It is advantageous when the side opening is formed at a side of the power tool remote from the working tool-side end of the power tool and faces in a direction opposite an operational direction of the power tool. Such an arrangement of the side opening reliably prevents penetration of the removable material into the cooling flow path.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
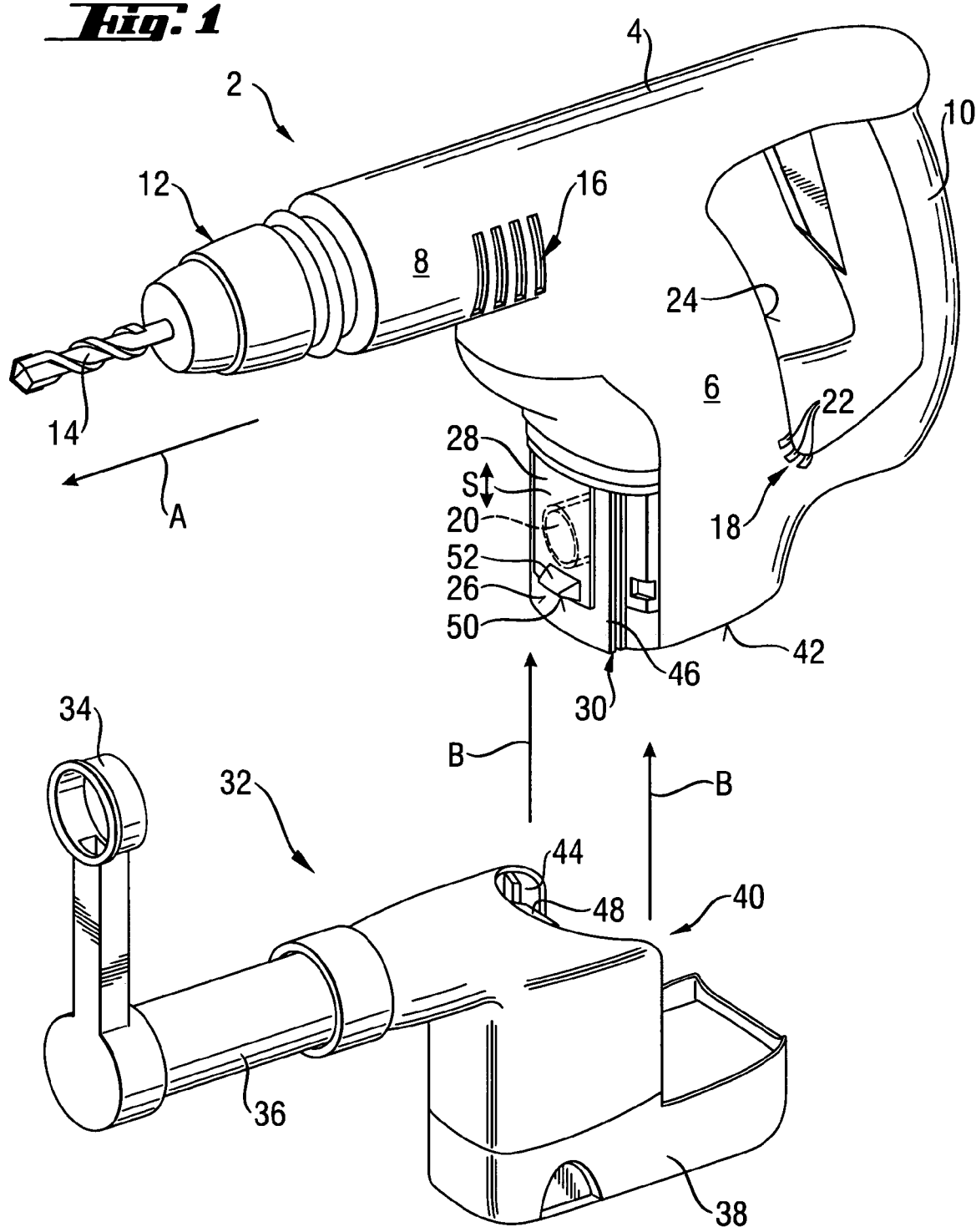
FIG. 1 a perspective exploded view of a hand-held power tool according to the present invention with a dust suction module which is separated from the tool.

A hand-held power tool 2 according to the present invention, which is shown in FIG. 1, is formed as a drilling took, e.g., as a hammer drill and includes a housing 4 that is formed of a motor housing 6, drive gear housing 8, and a handle 10. A tool head 12, in which a working tool 14 is received, projects from the drive gear housing 8 in an operational direction A of the power tool 2.

In the drive gear housing 8, there is provided an air outlet 16 in form of a plurality of slot-shaped openings. Further, the power tool 2 has a two-part air inlet which is formed of a side opening 18 and a connection opening 20 which is shown with dash lines.

The side opening 18 is formed of a plurality of slot-shaped housing recesses 22. They are provided on a back side 24 of the motor housing 6 and face away from the working tool side end of the power tool 2 in a direction opposite the operational direction A.

The connection opening 20 is provided on a front side 26 of the motor housing 6 and faces in the operational direction A. On the front side 26, there is also provided a cover 28 that closes the connection opening 20 in its closed position which is shown in the drawings. The cover 28 is displaceable in a displacement direction S in the region of an attachment arrangement generally designated with a reference numeral 30.

The attachment arrangement 30 is used for attaching a dust suction module 32 to the power tool 2. The dust suction module 32 has a suction head 34 which is connected with the aspirator housing 38 by a telescopic tube 36. The aspirator housing 38 has a receiving region 40 that serves for receiving a free end 42 of the motor housing 6 when the dust suction module 32 is attached to the power tool 2.

The receiving region 40 is provided with two attachment ribs 44 that can be inserted in correspondingly formed guide grooves 46 upon being displaced in the attachment direction B. The guide grooves 46 extend parallel to the displacement direction S of the cover 28, with the cover 28 being located between the two guide grooves 46.

The receiving region 40 has an entraining member 48 that projects from the aspirator housing 38 into the receiving region 40. Upon displacement of the dust suction module 32 in the attachment direction B for attaching it to the power tool 2, the entraining member 48 abuts a stop surface 50 that is formed by an operational member 52 extending in a direction transverse to the cover displacement direction S. In this way, upon connection of the dust suction module 32 with the power tool 2 by displacing the module 32 in the displacement direction "B" thereof, the cover 38 is displaced in its displacement direction S into an open position thereof by the entraining member 36, opening the connection opening 20.

Figure 2:
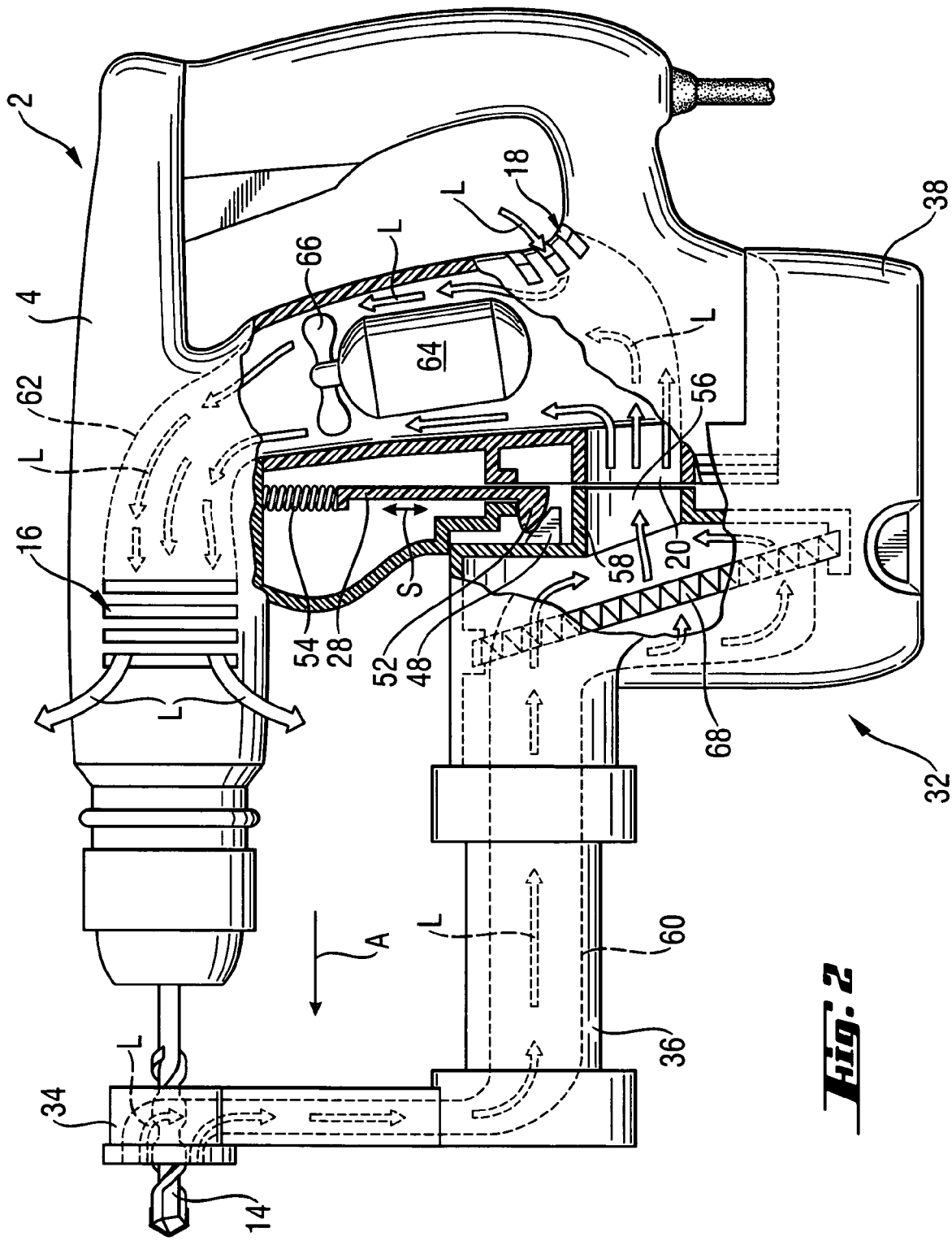
FIG. 2 a partially cross-sectional side view of a hand-held power tool according to the present invention with the attached dust suction module.

FIG. 2 shows the power tool 2 with the dust suction module 32 being attached thereto. In the condition shown in FIG. 2, the cover 28 is held in the open position by the entraining member 48 that engages the operational member 52 and acts against a biasing force of a spring 54. The connection opening 20 coincides with an open end 56 of a suction conduit 58. The suction conduit 58 forms a suction path 60 that connects the suction head 34 with the receiving region 40.

As shown in FIG. 2, the power tool 2 has a cooling flow path 62 that connects the air inlet, which is formed of the connection opening 20 and the side opening 18, with the air outlet 16. In the cooling flow path 62, there is arranged a motor 64 that serves for driving the working tool 14, without the particularities of connection of the motor 64 with the working tool 14 being shown. When the dust suction module 32 is attached to the power tool 2, the working tool 14 extends through the suction head 34, as shown in FIG. 2. The drive motor 64 also drives an air flow generator 66 which is formed as a ventilator.

During the operation of the power tool 2, the motor 64 is turned on, driving the air flow generator 66. With the rotating air flow generator 66, an air stream, which is designated with arrows L, is generated, flowing from the side opening 18 and the connection opening 20 through the cooling flow path 62 to the air outlet 16. The air stream passes past the motor 64, cooling the same. The air is also aspirated through the suction path 60, which is likewise shown with the arrows L.

The air stream, which is shown with arrows L, in the suction path 60 can, thus, be used for suction of the material that is produced, during working of a workpiece with the working tool 14, in the region of the suction head 34. The air flows, together with the removable material, from the suction head 34 through the telescopic tube 36 to the aspirator housing 38. In the aspirator housing 38, the removable material is filtered out by a filter element 68, and the purified air stream L flows through the suction conduit 58 and the connection opening 20 into the suction path 62. With the connection opening 20 being formed at the front side 26 of the motor housing 6 and facing in the operational direction, the suction path 60 is relatively short, without large flow losses. In the cooling flow path 62, the air stream exiting the suction path 60, together with the air stream entering through the side opening 18, are used for cooling of the motor 64 and then exit the power tool 2 through the air inlet 16.

In case when the power tool 2 should be used without the dust suction module 32, the module is removed in a direction opposite the module displacement direction B out of the retaining arrangement 30. At that, the cover 28 is displaced by the spring 54 in the displacement direction S in its closing position, shown in FIG. 1.

When the power tool 2 operates without the dust suction module 32, the air is aspirated only through the side opening 18. With the side opening 18 being provided at a location remote from the tool-side end of the power tool 2, suction of the removable material during the tool operation is prevented.

Though the present invention was shown and described with references to the preferred embodiment, such is merely illustrative of the present invention and is not to be construed as a limitation thereof and various modifications of the present invention will be apparent to those skilled in the art.

It is therefore not intended that the present invention be limited to the disclosed embodiment or details thereof, and the present invention includes all variations and/or alternative embodiments within the spirit and scope of the present invention as defined by the appended claims.

What is claimed is:

1. A hand-held power tool (2) connectable with a dust suction module (32) having a suction path (60), the power tool (2) comprising a housing (4, 6) including an air outlet (16) and an air inlet having a side opening (18) and a connection opening (20) connectable with the suction path (60) of the dust suction module (32), the dust suction module (32) having a suction conduit (58) for connecting the suction path (60) with an air flow path (62) between the air inlet and the air outlet (16) and adjoining the connection opening (20) in a connected condition of the dust suction module (32) with the power tool (2); a motor (64) located in the tool housing (4, 6); an air flow generator (66) for cooling the motor (64) and located, together with the motor (64), in an air flow path (62); and a closing member provided on the connection opening (20), operable by the dust suction module (32), and having, in a connected condition of the dust suction module (32) with the power tool (2), an open position and having a closed position in a disconnected condition of the dust suction module (32) from the power tool (2).

2. A hand-held power tool according to claim 1, wherein the closing member is formed as a cover (28) displaceable over the housing (4, 6).

3. A hand-held power tool according to claim 2, wherein the cover (28) is supported for a linear displacement between the open and closed positions thereof.

4. A hand-held power tool according to claim 3, where in the cover (28) has a stop surface (50) extending transverse to a displacement direction (B) of the dust suction module (32) along which the dust suction module (32) is displaced for connection with the power tool (2), and wherein the dust suction module (32) has an entraining member (48) engageable with the stop surface (50) of the cover (28) for displacing the cover (28) from the closed position thereof to an open position thereof upon connection of the dust suction module (32) with the power tool (2).

5. A hand-held power tool according to claim 4, comprising means for preloading the cover (28) in the closed position thereof.

6. A hand-held power tool according to claim 1, wherein the connection opening (20) is formed at a working tool-side end of the power tool (2).

7. A hand-held power tool according to claim 1, wherein the side opening (18) is formed at a side of the power tool (2) remote from the working tool-side end of the power tool (2) and faces in a direction opposite an operational direction of the power tool.

* * * * *